US011920371B2

(12) United States Patent
Roberts, III

(10) Patent No.: US 11,920,371 B2
(45) **Date of Patent: *Mar. 5, 2024**

(54) ADJUSTABLE DECORATIVE LOCKSET ROSE ASSEMBLY

(71) Applicant: Schlage Lock Company LLC, Carmel, IN (US)

(72) Inventor: Rockwood T. Roberts, III, Carmel, IN (US)

(73) Assignee: Schlage Lock Company LLC, Carmel, IN (US)

(*) Notice: Subject to any disclaimer, the term of this patent is extended or adjusted under 35 U.S.C. 154(b) by 37 days.

This patent is subject to a terminal disclaimer.

(21) Appl. No.: 17/380,875

(22) Filed: Jul. 20, 2021

(65) Prior Publication Data

US 2022/0010591 A1 Jan. 13, 2022

Related U.S. Application Data

(63) Continuation of application No. 15/989,594, filed on May 25, 2018, now Pat. No. 11,066,849.

(51) Int. Cl.
*E05B 15/02* (2006.01)
*E05B 63/04* (2006.01)

(52) U.S. Cl.
CPC .............. *E05B 15/02* (2013.01); *E05B 63/04* (2013.01)

(58) Field of Classification Search
CPC ........ E05B 15/02; E05B 63/04; E05B 63/042; E05B 63/0056; E05B 55/05; E05B 3/06; E05B 3/003; E05B 3/00; E05B 9/00; E05B 9/002; E05B 9/08; E05B 9/082; E05B 1/0007; E05B 1/003; E05B 1/0061; Y10T 292/57; Y10T 292/82; Y10T 292/91; Y10T 292/53; Y10T 292/54; Y10T 292/64
USPC .................................................. 292/347, 357
See application file for complete search history.

(56) References Cited

U.S. PATENT DOCUMENTS

| | | | |
|---|---|---|---|
| 3,326,588 | A | 6/1967 | Clark |
| 6,523,375 | B2 | 2/2003 | Beatty |
| 6,568,231 | B1 | 5/2003 | Huang |

(Continued)

FOREIGN PATENT DOCUMENTS

| | | | | |
|---|---|---|---|---|
| DE | 20314279 U1 * | 11/2003 | ............... | E05B 3/06 |
| GB | 2159398 A * | 12/1985 | ............... | E05B 3/06 |

*Primary Examiner* — Kristina R Fulton
*Assistant Examiner* — James Edward Ignaczewski
(74) *Attorney, Agent, or Firm* — Taft Stettinius & Hollister LLP

(57) ABSTRACT

A rose assembly for a lockset configured to conceal and protect at least portions of a chassis that are positioned in a through-hole of an entryway device. The rose assembly can include at least a rose base and a rose plate. The rose plate can be assembled to the rose base at one of a plurality of orientations so that the rose assembly has an asymmetrical configuration. The rose assembly can include an indexing system to control the orientations at which the rose plate can be selectively secured to the rose base. The indexing system can include first and second male members and a plurality of female members, the first male member being sized to be matingly received in some, but not all, of the plurality of female members. The rose plate can be secured to the rose base by plate fasteners, magnets and/or double-sided tape.

27 Claims, 7 Drawing Sheets

(56) References Cited

U.S. PATENT DOCUMENTS

| | | | | |
|---|---|---|---|---|
| 6,640,593 | B1 * | 11/2003 | Hannah | E05B 63/0056 70/282 |
| 6,745,602 | B2 | 6/2004 | Nakasone et al. | |
| 7,401,484 | B1 * | 7/2008 | Holmes | E05B 13/10 70/423 |
| 7,475,925 | B2 | 1/2009 | Huang et al. | |
| 9,890,713 | B2 * | 2/2018 | Zhang | B64D 29/00 |
| 2006/0244272 | A1 | 11/2006 | Roth et al. | |
| 2010/0148524 | A1 * | 6/2010 | Czerwinski, Jr. | E05B 15/02 292/299 |
| 2015/0275543 | A1 * | 10/2015 | Karnutsch | E05B 1/0061 248/551 |
| 2017/0148524 | A1 | 5/2017 | Shibata | |
| 2017/0218659 | A1 | 8/2017 | Chong et al. | |
| 2017/0275915 | A1 | 9/2017 | Murphy | |
| 2022/0010586 | A1 * | 1/2022 | Romero | E05B 1/0053 |

* cited by examiner

ADJUSTABLE DECORATIVE LOCKSET ROSE ASSEMBLY

CROSS REFERENCE TO RELATED APPLICATIONS

The present application is a continuation of U.S. patent application Ser. No. 15/989,594 filed May 25, 2018 and issued as U.S. Pat. No. 11,066,849, the contents of which are hereby incorporated by reference in their entirety.

BACKGROUND

Embodiments of the present application generally relate to decorative roses for locksets. More particularly, but not exclusively, embodiments of the present application relate to a decorative rose assembly having at least one external asymmetrical decorative component that is selectively adjustable relative to the orientation of at least other portions of the rose assembly, a lockset, and/or an associated entryway device.

Various types of locksets can include mechanical components that are coupled to, extend from, and/or are positioned within an entryway device. For example, certain types of locksets can include mechanical components that are positioned within a hole that generally extends between opposing sides of an entryway device, such as, for example, between interior and exterior sides of a door or gate, among other holes in devices used to control ingress/egress through a space or opening. For example, with respect to certain types of locksets, the hole in the entryway device can house at least a portion of a spring cage, slide assembly, and/or bolt or latch, among other mechanical components of the lockset. Locksets can therefore include rose or escutcheon, referred to collectively herein as a rose, that can be sized and positioned to at least conceal and/or protect at least a portion of the mechanical components of the lockset that are positioned about the hole of the entryway device. However, at least some of the components that the rose conceals, and/or that the rose is positioned about, are moveable components that are involved in the operation of the lockset, including, for example, components that can facilitate the retraction/extension of an associated bolt or latch. Thus, while the rose can be sized to conceal or protect at least certain components of the lockset, the rose should also be sized and shaped so that the rose does not adversely interfere with the mechanical operation of the lockset.

Further, roses are often constructed as a unitary decorative component. Yet, such a single component construction can limit aesthetic opportunities, as well as cause the implementation of more complex aesthetics to the rose to be generally cost prohibitive. For example, attempts to provide a unitary rose with multiple colors or coatings can often require either masking of the rose of production of the rose using dual molding. Additionally, such single construction components are often limited to one particular orientation, and thus do not have the flexibility to accommodate alteration of the aesthetic by selectively changing the relative orientations of different portions or components of the rose. Moreover, such unitary rose constructions can result in the production of roses that have limited application, such as a rose lacking the flexibility or modularity to be selectively adaptable for use in a right handed and left handed applications.

BRIEF SUMMARY

An aspect of an embodiment of the present application is a rose assembly that includes a rose plate having a front plate comprising a first side, a second side, and a first opening, the first opening extending between the first side and the second side. The rose assembly can further include a rose base having a base plate comprising an outer face, an inner face, and a second opening, the second opening extending between the inner face and the outer face. Additionally, the rose assembly can include an indexing system that includes at least one male member and at least one female member. The at least one male member can be positioned on one of the rose plate and the rose base, and the at least one female member can be positioned on the other of the rose plate and the rose base. Further, the indexing system can be configured to facilitate selective secure placement of the rose plate to the rose base at one of a plurality of assembly orientations, at least some of the plurality of assembly orientations providing the rose assembly with an asymmetrical configuration. Additionally, for at least one of the plurality of assembly orientations, the first opening is generally aligned, and in communication, with the second opening.

Another aspect of an embodiment of the present application is a rose assembly comprising a rose plate having a first side, a second side, and a first opening, the first opening extending between the first side and the second side. Additionally, the first opening of the rose plate can be offset from a central location of the rose plate such that the rose plate has an asymmetrical configuration. The rose plate assembly can also include a rose base having an outer face, an inner face, and a second opening, the second opening extending between the inner face and the outer face. Additionally, the rose assembly can further include an indexing system that is configured to facilitate selective secure placement of the rose plate to the rose base at one of a plurality of assembly orientations, at least some of the plurality of assembly orientations providing the rose assembly with an asymmetrical configuration. According to certain embodiments, the indexing system comprises a plurality of male members and a plurality of female members, the plurality of male members extending from one of the rose plate and the rose base, and the plurality of female members positioned about the other of the rose plate and the rose base. At least two of the plurality of female members can be configured to matingly receive at least one male member of the plurality of male members, but not matingly receive at least one other male member of the plurality of male members.

Another aspect of an embodiment of the present application is a method that includes forming a rose base of a rose assembly and forming a rose plate of the rose assembly, the rose base and the rose plate being separate components. Additionally, at least one of the rose base and the rose plate can have an opening that is sized to receive placement of a spindle of a chassis of a lockset. The method can further include selecting one of a plurality of orientations for assembly of the rose plate to the rose base, each of the plurality of orientations configured to accommodate insertion of a male member of one of the rose plate and the rose base into one of a plurality of female slots of the other of the rose plate and the rose base. Further, the male member can be inserted into a selected one of the plurality of female members to form at least a portion of the rose assembly, the rose assembly having an asymmetrical configuration. The method can also include coupling the rose assembly to the chassis of the lockset.

BRIEF DESCRIPTION OF THE DRAWINGS

The description herein makes reference to the accompanying figures wherein like reference numerals refer to like parts throughout the several views.

Figure 1A:
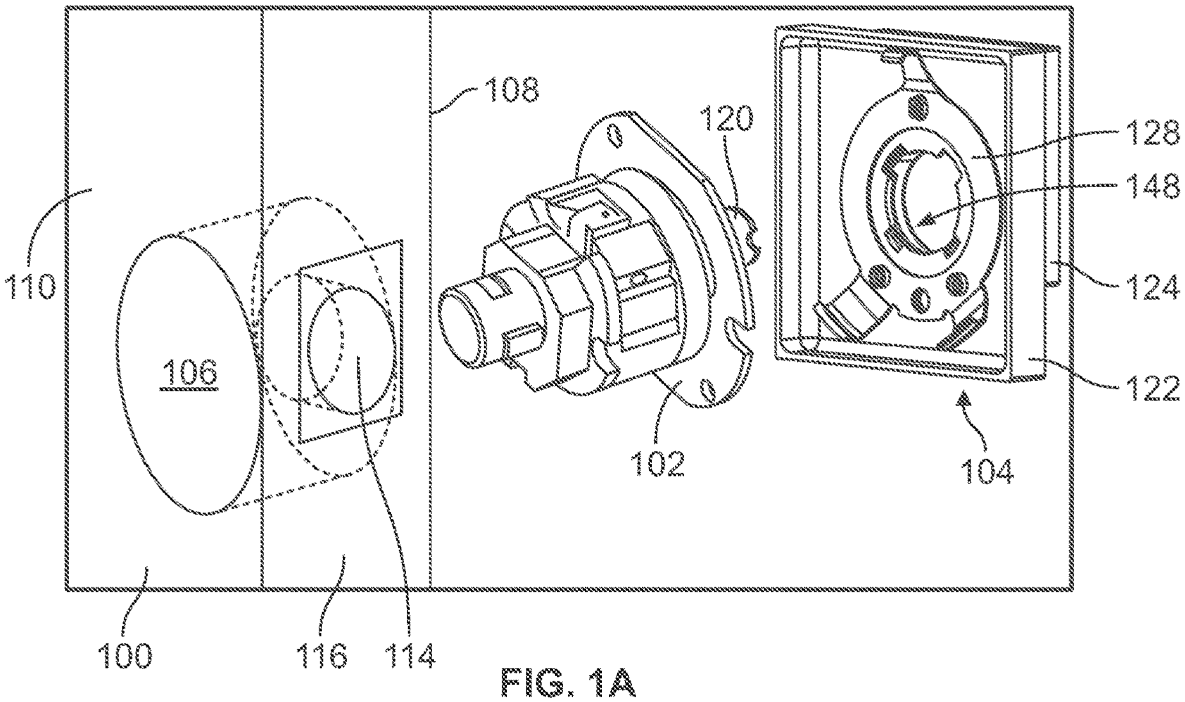
FIG. 1A illustrates an exploded perspective side view of a portion of an entryway device, an exemplary chassis of a lockset, and an exemplary rose assembly according to an illustrated embodiment of the present application.

The foregoing summary, as well as the following detailed description of certain embodiments of the present application, will be better understood when read in conjunction with the appended drawings. For the purpose of illustrating the application, there is shown in the drawings, certain embodiments. It should be understood, however, that the present application is not limited to the arrangements and instrumentalities shown in the attached drawings. Further, like numbers in the respective figures indicate like or comparable parts.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

FIG. 1A illustrates an exploded perspective side view of a portion of an entryway device 100, an exemplary chassis 102 of a lockset, and an exemplary rose assembly 104 according to an illustrated embodiment of the present application. According to the illustrated embodiment, the entryway device 100 is configured to control the ingress/egress through a space or area. For example, according to certain embodiments, the entryway device 100 can be, but is not limited to, a door or gate. Additionally, the entryway device 100 includes a through hole 106 that extends between a first side 108 and an opposing second side 110 of the entryway device 100. According to certain embodiments, one of the first and second sides 108, 110 of the entryway device 100 is an interior side of the entryway device 100, while the other of the first and second sides 108, 110 is an exterior side of the entryway device 100. The through hole 106 can be sized to house at least portions of mechanical components of a lockset, including, for example, mechanical components that move in connection with operation of the lockset, including, for example, operation relating to the extension and retraction of a latch or bolt 112 (FIG. 1B) of the lockset. For example, according to at least certain types of locksets, the through hole 106 can have a size, such as, for example, a diameter, that accommodates placement of at least a portion of the chassis 102, such as, for example, a spring cage, among other components, of the lockset.

A latch hole 114 can be generally orthogonal to the through hole 106 and sized to accommodate linear displacement of at least a portion of the latch or bolt 112 along the latch hole 114 as the latch or bolt 112 is displaced between retracted and extended positions. Thus, the latch hole 114 can extend through an edge wall 116 of the entryway device 100 that is between the first and second sides 108, 110. According to certain embodiments, the edge wall 116 of the entryway device 100 is generally perpendicular to the first and second sides 108, 110 of the entryway device 100, and is positioned to be adjacent to a stile of a doorframe when the entryway device 100 is in a closed position.

Figure 1B:
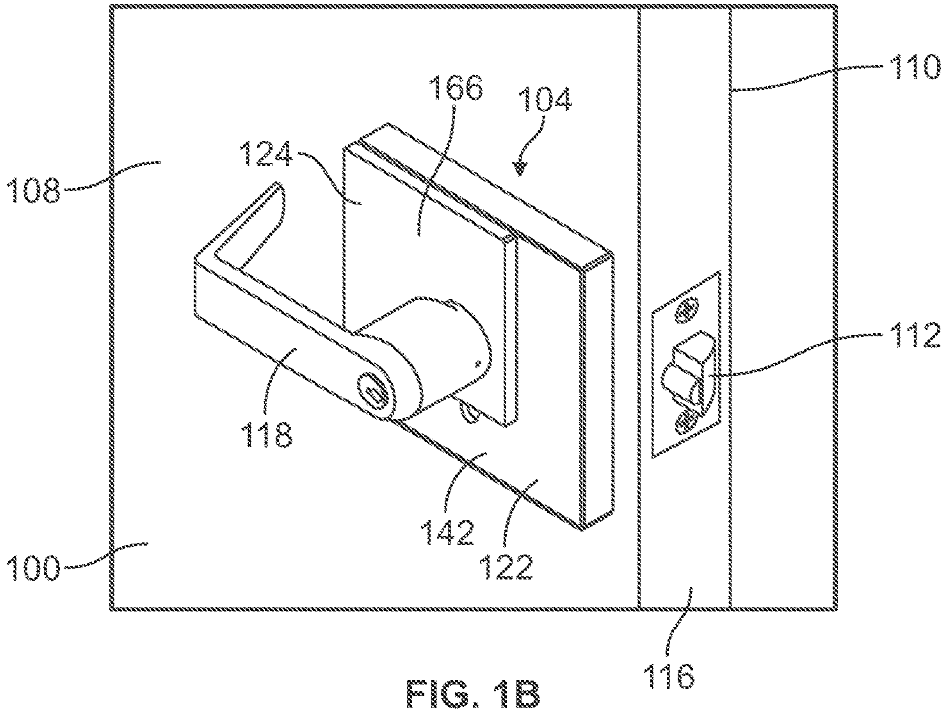
FIG. 1B illustrates a perspective side view of a portion of a lockset having an exemplary rose assembly attached to the entryway device shown in FIG. 1A.

FIG. 1B illustrates a perspective side view of a portion of a lockset having an exemplary rose assembly 104 attached to the entryway device 100 shown in FIG. 1A. As illustrated, the lockset can include a lever, knob, or handle 118 that is positioned generally adjacent to the first side 108 of the entryway device 100. Similarly, according to certain embodiments, the lockset can also include a second lever, knob, or handle that is positioned generally adjacent to the second side 110 of the entryway device 100. The handle(s) 118 of the lockset can be coupled to components of the lockset such that rotational displacement of the handle(s) 118 can facilitate linear displacement of the latch or bolt 112 such that the latch or bolt 112 can be displaced between retracted and extracted positions relative to at least the edge wall 116 of the entryway device 100. For example, according to certain embodiments, the handle(s) 118 can be coupled to a rotatable spindle 120 of a chassis of the lockset, including, for example, a spindle of a spring cage assembly, that is configured to at least translate the rotational displacement of the handle(s) 118 into linear displacement that can at least facilitate the displacement of the latch or bolt 112 between retracted and extended positions. Further, as previously discussed, at least a portion of the chassis 102, as well as at least portions of lockset components associated with the latch or bolt 112, can be housed in, and/or extend from, the through hole 106 in the entryway device 100. While the foregoing exemplary lockset is discussed in terms of a lockset having a chassis 102 that includes spring cage assembly, components of other types or designs of locksets or chassis could, alternatively, be at least partially housed within, or extend from, the through hole 106 of the entryway device 100.

FIGS. 1A-4 illustrate an exemplary rose assembly 104 according to an illustrated embodiment of the subject application. According to certain embodiments, the rose assembly 104 can include a rose base 122, a rose plate 124, and one or more plate fasteners 126. Additionally, as shown by at least FIGS. 3 and 4, according to certain embodiments, the rose assembly 104 can further include one or more connection brackets 128, such as, for example, a spring clip, that can at least assist in fastening the rose assembly 104 to the other components of the lockset, such as, for example, to the chassis 102 of the lockset. As discussed below, the rose plate 124 can be selectively secured to the rose base 122 in two or more orientations relative to at least the rose base 122. Further, as also discussed below, the rose assembly 104 can have an asymmetrical design that can accommodate the rose plate 124 being selectively secured to the rose base 122 in one of at least two visually distinct orientations, such as, for example, right and left hand orientations relative to at least the rose base 122, neither of which orientations result in the rose assembly 104 adversely interfering with the operation of the lockset. Additionally, as the rose plate 124 and rose base 122 are separate components, the rose plate 124 and rose base 122 can be constructed from one or more different materials and/or have a different shape(s), finish(es), and/or texture(s) such that, when the rose plate 124 and rose base 122 are assembled, provides the rose assembly 104 with a single aesthetic.

As shown in at least FIGS. 4-7, the rose base 122 can include an outer sidewall 130 that extends about an outer periphery of the rose base 122. For at least purposes of illustration, the outer sidewall 130 of the exemplary rose assembly 104 generally has four sides that provide the rose base 122 with a generally square or rectangular shape. However, the outer sidewall 130 can have a variety of other shapes and configurations, including circular, oval, non-circular, triangular, and polygonal shapes, among other shapes, as well as combinations thereof. Additionally, the outer sidewall 130 and have a shape and/or size that is larger than at least the corresponding size of the through hole 106 at the side 108, 110 of the entryway device 100 to which the rose assembly 104 is to be placed. For example, the rose assembly 104 that is to be positioned at or against the first side 108 of the entryway device 100 can have a shape and/or size that is larger than the diameter of the portion of the through hole 106 that extends through the first side 108 of the entryway device 100. By having a larger shape and/or size, the rose assembly 104, when operably secured to the entryway device 100, can conceal at least the through hole 106 at the first side 108 of the entryway device 100 from view. Similarly, another rose assembly 104 positioned at the second side 110 of the entryway device 100 can also have a size or shape that is larger than the size of at least the portion of the through hole 106 that extends through the second side 110 of the entryway device 100, and thereby conceal the through hole 106 from view from the second side 110 of the entryway device 100.

According to the illustrated embodiment, the outer sidewall 130 can extend between a first end 132 and an opposing second end 134 of the outer sidewall 130, and generally define an interior area 136 of the rose base 122. The interior area 136 can have an opening 138 at, and which can be generally defined by, the first end 132 of the outer sidewall 130. Additionally, the interior area 136 can be at least partially enclosed at an end of the interior area 136 opposite of the opening 138 by a base plate 140 of the rose base 122 that is adjacent to, or extends between, at least portions of the second end 134 of the outer sidewall 130.

Figure 5:
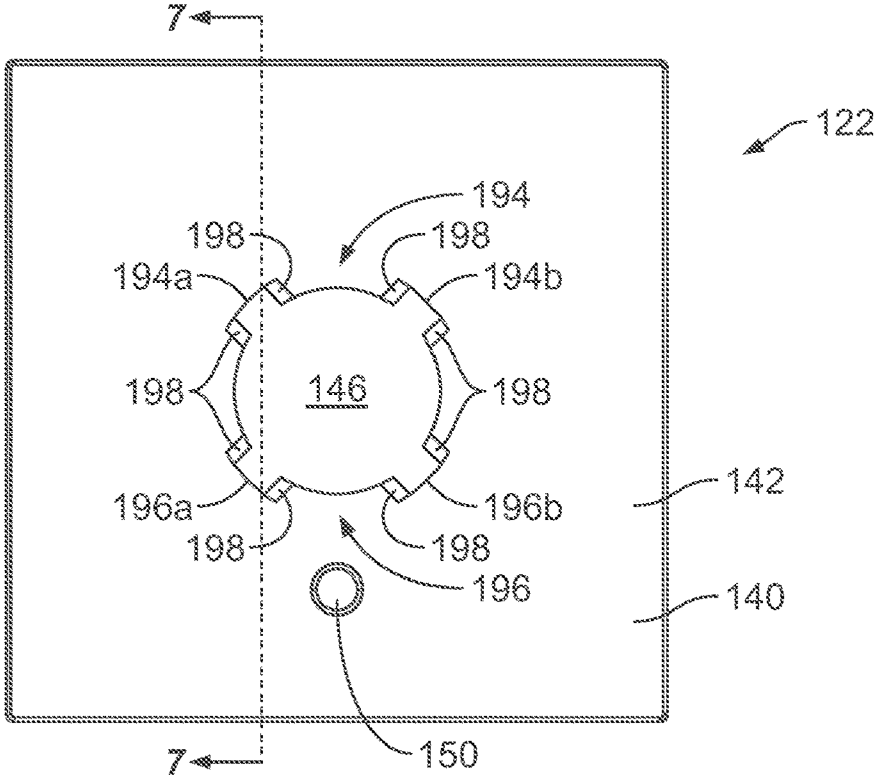
FIGS. 5 and 6 illustrate front and rear side views, respectively, of an exemplary rose base according to an illustrated embodiment of the present application.
Figure 6:
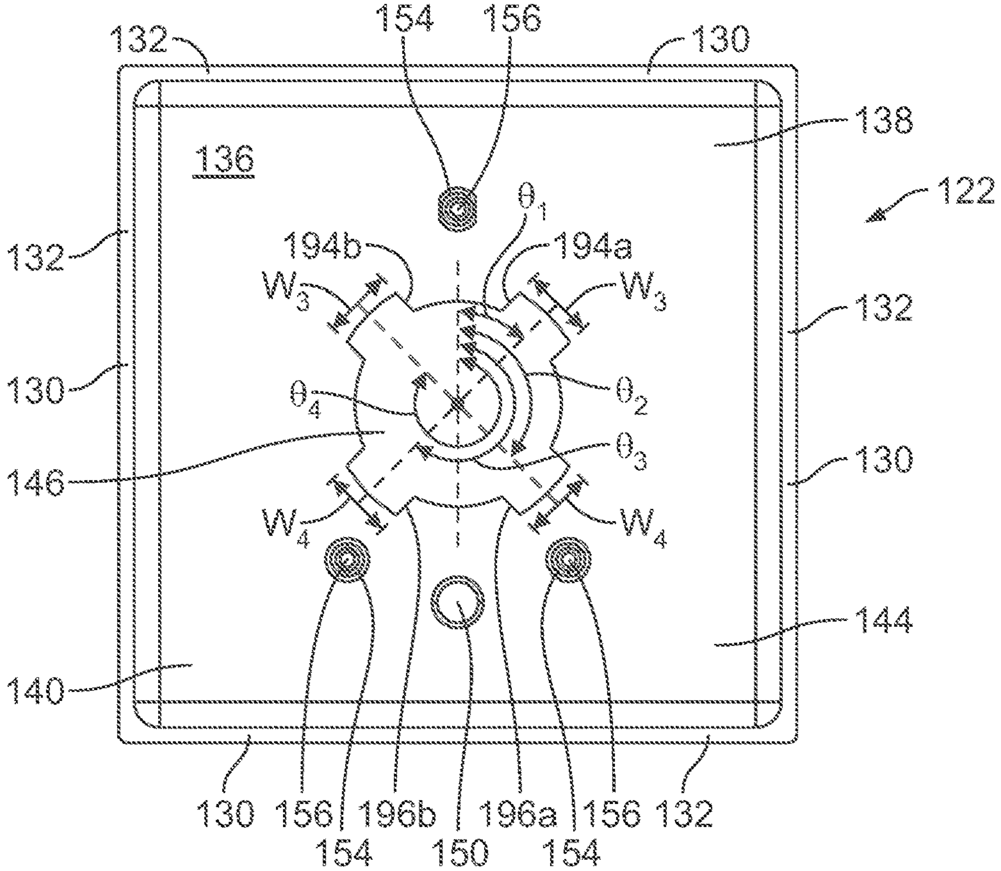

As shown by at least FIGS. 5 and 6, the base plate 140 can have an outer face 142 and an inner face 144, the inner face 144 being adjacent to the interior area 136 of the rose base 122. Additionally, the base plate 140 can include an opening 146 that extends through both the outer an inner faces 142, 144 of the base plate 140 and which is sized to receive insertion of at least a portion of chassis 102, such as, for example, the spindle 120, and/or to receive the handle 118. In the illustrated embodiment, the opening 146 has a generally circular cross-sectional shape. However, the opening 146 can have a variety of other shapes that are sized to accommodate at least rotational displacement of components of the lockset that may extend through the opening 146. Additionally, while the opening 146, which is in communication with the interior area 136 of the rose base 122, is shown in the illustrated embodiment as being positioned at a generally central location on the base plate 140 and/or with respect to the rose base 122, the opening 146 can be positioned at a variety of other locations. For example, depending on the shape and/or configuration of the base plate 140 and/or the rose base 122, and or based on a particular aesthetic that is to be attained, the opening 146 can be located at a variety of other locations about the base plate 140. Additionally, as discussed below, the base plate 140 can also include members of an indexing or keying system 148 that are positioned about or around at least a portion of the opening 146 that mate with other members of the indexing system 148 that are positioned on or about the rose plate 124 in a manner that allows the rose plate 124 to be securely connected to the base plate 140 at a selected one of two or more possible relative orientations.

Optionally, as shown in FIGS. 5 and 6, according to certain embodiments, the base plate 140 can also include one or more apertures 150 that can be used for other components of the lockset. For example, in the illustrated embodiment, the base plate 140 can include an aperture 150 that is configured to receive components associated with a thumb turn assembly. Moreover, for example, according to such embodiments, the aperture 150 can have a size, such as, for example, a diameter, that can provide passage for a portion of a spindle of a thumb turn assembly that extends through the interior area 136 and aperture 150 of the base plate 140, and which is coupled to a thumb turn that is accessible to a user or operator of the lockset. Additionally, or alternatively, the base plate 140 can include an aperture 150 sized to provide access to the face, and thus keyway slot, of a deadbolt cylinder, among apertures 150 for other components of the lockset.

Figure 3:
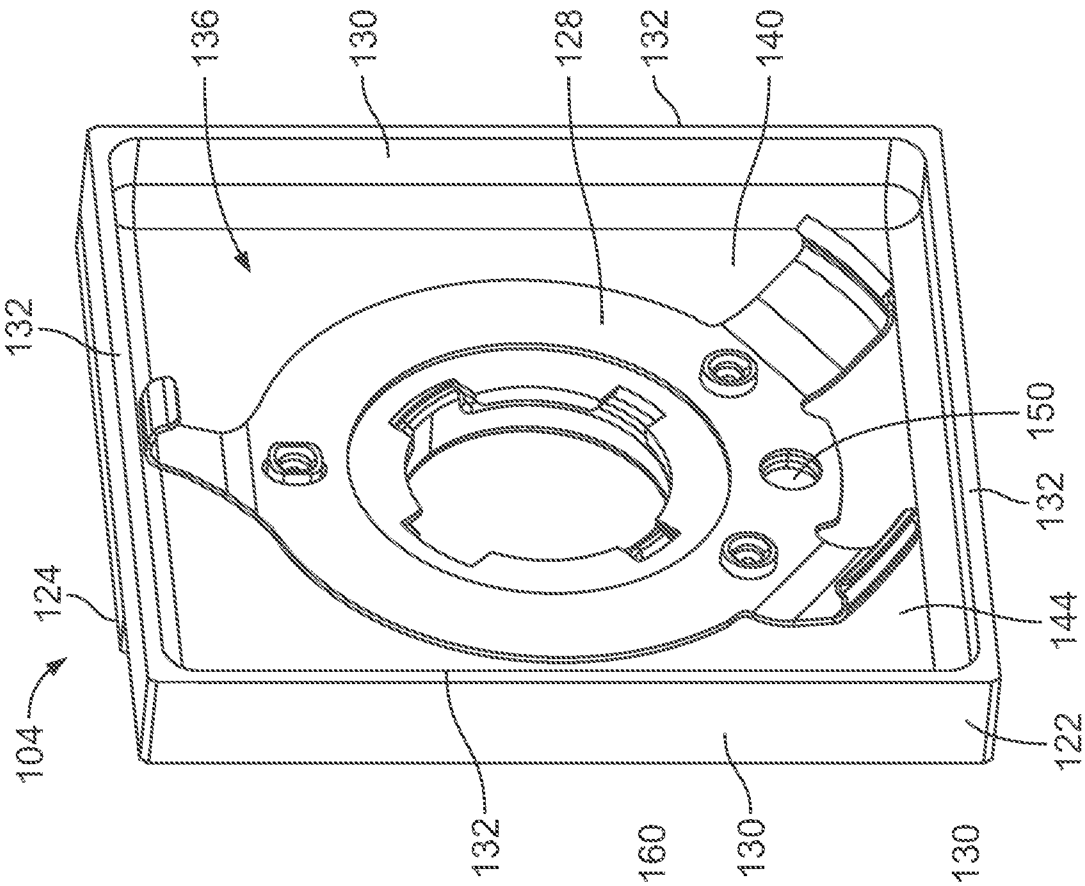
FIGS. 2 and 3 illustrate front side and rear side perspective views, respectively, of an exemplary rose assembly according to an illustrated embodiment of the present application.
Figure 2:
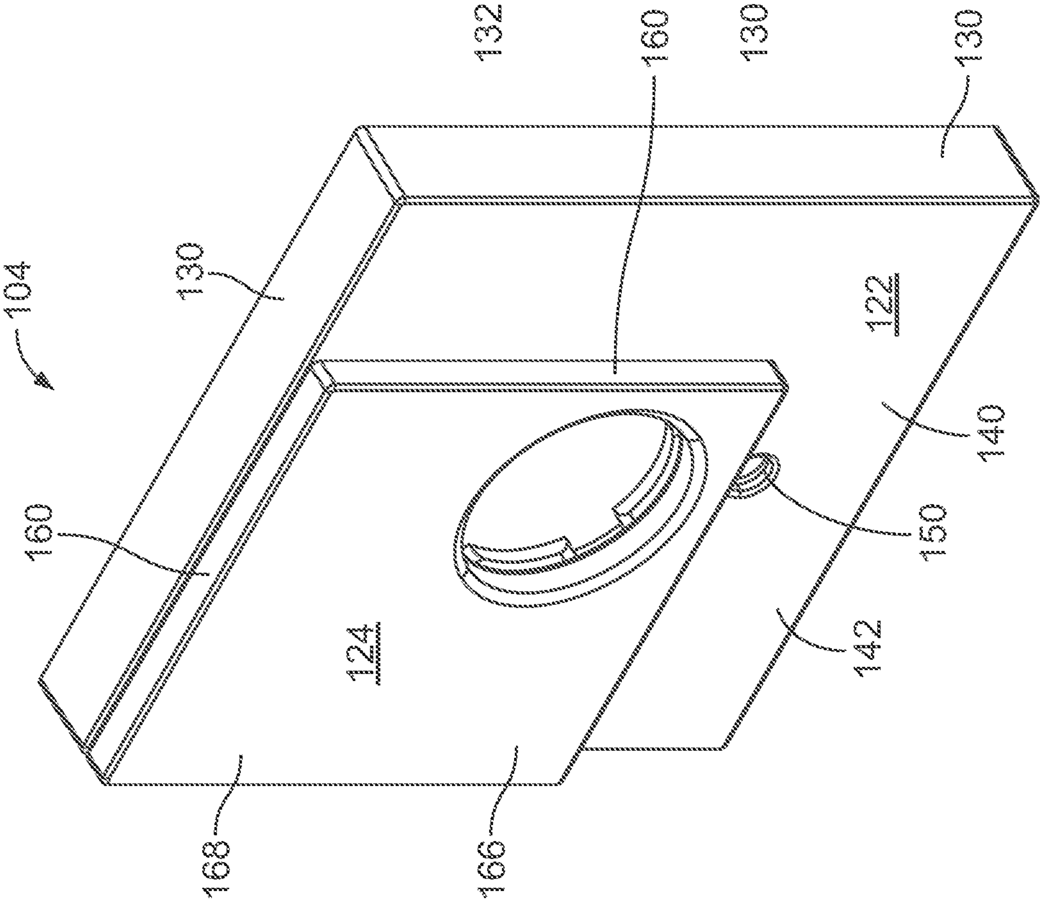

The interior area 136 of the rose base 122 can have a depth between the first end 132 of the outer sidewall 130 and the base plate 140 that is sized to accommodate at least partial recessed placement of at least a portion of the connection bracket 128 within the interior area 136, as shown by at least FIGS. 1A and 3. Further, according to certain embodiments, the interior area 136 of the rose base 122 can also have a depth that accommodates placement of at least a portion of the chassis 102, among other components of the lockset, when those portions of the chassis 102 are directly connected to the connection bracket 128 in a manner that secures the rose plate 124 to the chassis 102. For example, the connection bracket 128 can, according to certain embodiments, in include a plurality of hook shaped clips 152 that can extend around, into, or otherwise snap onto a mating feature on a portion the chassis 102 in a manner that secures at least the connection bracket 128 to the chassis 102.

Alternatively, or optionally, the rose assembly 104 can be configured for secure engagement with another component of the lockset, including, but not limited to, the chassis 102 or handle 118. For example, according to certain embodiments, a portion of the rose base 122 and/or rose plate 124 can include one or more first engagement members that can securely engage one or more second engagement members that are coupled to, or otherwise an integral portion of, the chassis 102 and/or handle 118. For example, one or more projections and/or apertures of the first engagement member (s) can be positioned in generally close proximity to the opening(s) 146, 176 in the rose base 122 and/or rose plate 124, and is/are configured to relatively securely engage a corresponding aperture and/or projection of the second engagement member(s) that is/are coupled to, or otherwise positioned about, the chassis 102 and/or handle 118. Thus, according to one exemplary embodiment, if the chassis 102 is already installed in the entryway device 100, the subsequent installation of the rose assembly 104 can result in the first engagement member(s) on the rose base 122 and/or rose plate 124 matingly engaging the second engagement member(s) of the chassis 102 in a manner that secures the rose assembly 104 to at least the chassis 102.

Additionally, one or more attachment members 154 can be positioned about at least a portion of the inner face 144 of the base plate 140. The attachment members 154 can be structured for secure engagement with one or more mechanical fasteners, such as, for example, bolts, screws, pins, or clamps, that can be used to securely attach the rose base 122 to the connection bracket 128, and thus secure the rose assembly 104 to the chassis 102. For example, in the illustrated embodiment, the attachment members 154 may be in the form of a plurality of legs that extend away from the inner face 144 of the base plate 140 and into the interior area 136 of the rose base 122. Further, according to certain embodiments, each of the legs can have apertures 156 that are sized to be threading engaged to a threaded mechanical fastener, among other types of secure connections. Additionally, the attachment members 154 can be arranged about the inner face 144 of the base plate 140 in a pattern that corresponds to, or generally aligns with, a pattern of fastener openings 158 in the connection bracket 128 such that mechanical fasteners can pass through the fastener openings 158 of the connection bracket 128 and securely engage the apertures 156 of the attachment members 154.

Referencing FIGS. 2 and 8-10, the rose plate 124 includes an outer wall 160 that extends about at least an outer periphery of the rose plate 124. According to the illustrated embodiment, the outer wall 160 is configured to provide the rose plate 124 with a generally rectangular or square shape. However, the outer wall 160 can be configured to provide the rose plate 124 with a variety of different shapes and configurations, including circular, oval, non-circular, and polygonal, among other shapes, as well as combinations thereof. Further, the outer wall 160 can have opposing first and second ends 162, 164, the second end 164 being adjoined, or otherwise adjacent, to a front plate 166 of the rose plate 124. The front plate 166 of the rose plate 124 can include opposing first and second sides 162, 164. Additionally, as the front plate 166 can be at least partially visible from at least the corresponding first or second side 108, 110 of the entryway device 100 when the rose assembly 104 is assembled and coupled to the entryway device 100, at least a portion of the first side 168 of the front plate 166 can have decorative or ornate features, finishes, and/or textures.

According to certain embodiments, the outer wall 160 of the rose plate 124 also generally defines an inner region 172 of the rose plate 124. The inner region 172 of the rose plate 124 can extend from an opening 174 that is generally defined by the first end 162 of the outer wall 160, to the second side 170 of the front plate 166.

The front plate 166 can include an opening 176 that extends through the first and second sides 162, 164 of the front plate 166. The opening 176 can be sized to receive insertion of at least a portion of the chassis 102, such as, for example, the spindle 120, and/or the handle 118. In the illustrated embodiment, the opening 176 has a generally circular cross-sectional shape. However, the opening 176 can have a variety of other shapes that are sized to accommodate at least rotational displacement of components of the lockset that may extend through the opening 176. Additionally, the opening 176 of the front plate 166 can have a size, such as, for example, a diameter, that is generally similar to, and/or the same as, the corresponding size, such as, for example, diameter, of the opening 146 in the base plate 140.

Figure 8:
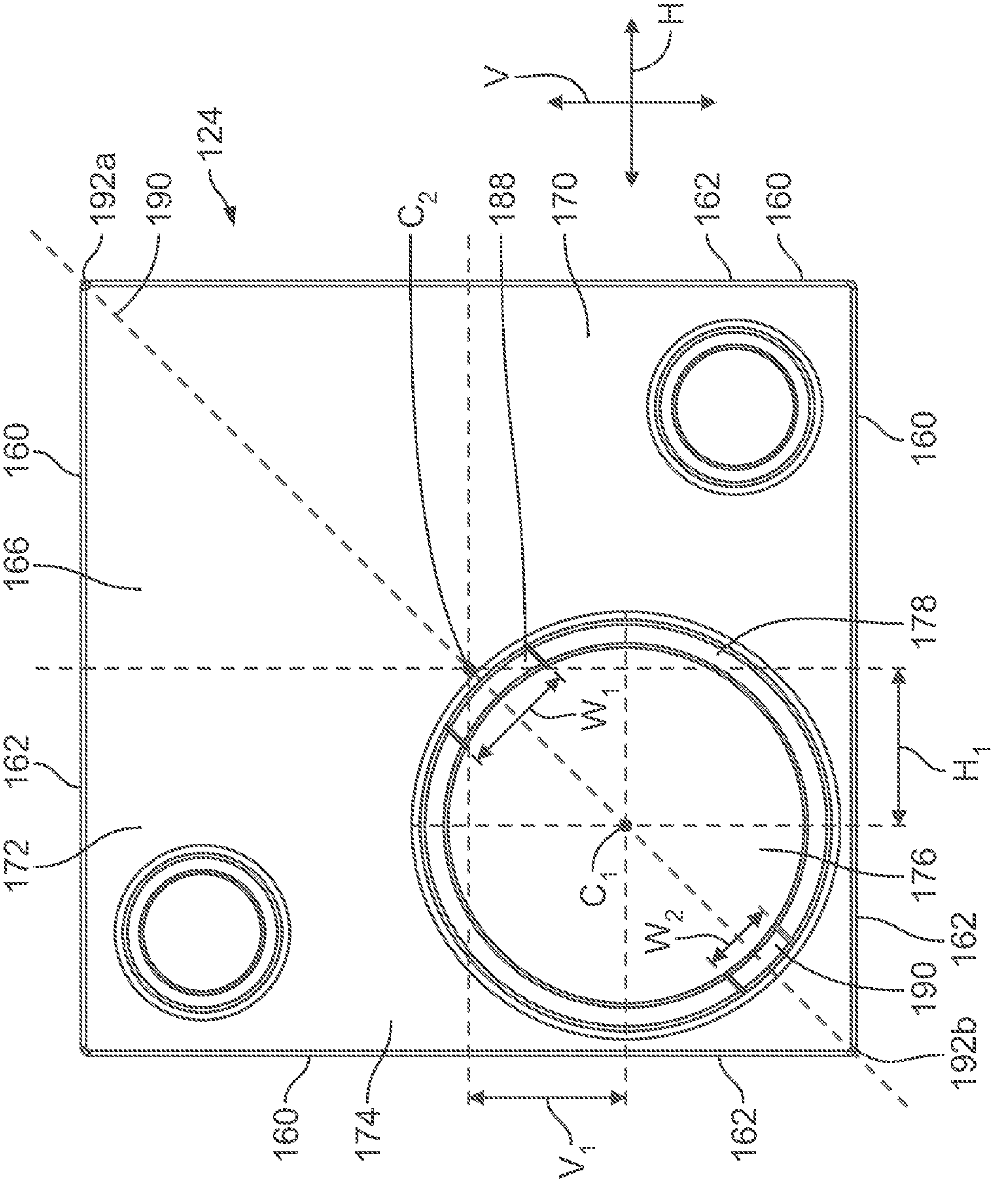
FIG. 8 illustrates a rear side view of a rose plate according to an illustrated embodiment of the present application.
Figure 7:
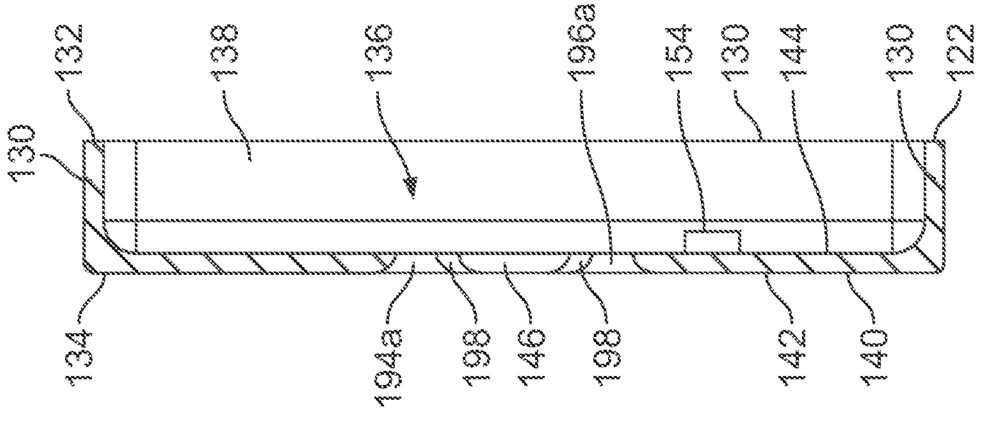
FIG. 7 illustrates a cross sectional side view of a rose base taken along line 7-7 in FIG. 5.

As shown by at least FIG. 8, the opening 176 of the front plate 166 can be positioned so that the rose plate 124 has an asymmetrical configuration. For example, referencing FIG. 8, a center point (as reference by "$C_1$" in FIG. 8) through which a central longitudinal axis of the opening 176 extends can be offset from a center point ("$C_2$") at the central location of the rose plate 124 in at least one of a vertical direction ("V" direction in FIG. 8) and horizontal direction ("H" direction in FIG. 8). For example, in the embodiment depicted in FIG. 8, the center point ("$C_1$") of the opening 176 is offset from the center point ("$C_2$") of the rose plate 124 in both the horizontal direction by a first distance ("$H_1$") and in the vertical direction by a second distance ("$V_1$") that may, or may not be equal to the first distance. Such off centered placement of the opening 176 relative to at least the front plate 166, and thus the rose plate 124, is just one non-exclusive example of a manner in which the rose assembly 104 can, when the rose plate 124 is assembled to the rose base 122, be configured to have an asymmetrical configuration.

According to the illustrated embodiment, the front plate 166 can also include an opening hub 178 that extends from the second side 170 of the front plate 166, and which is positioned about at least a portion of the opening 176 of the front plate 166. According to certain embodiments, the opening hub 178 may extend a distance into the inner region 172 of the rose plate 124 away from the second side 170 of the front plate 166 that accommodates the opening hub 178 abutting, or being in relatively close proximity to, the outer face 142 of the base plate 140 of the rose base 122. Thus, for example, according to certain embodiments, the opening hub 178 can have a length such that, when the rose plate 124 is assembled to the rose base 122, the opening hub 178 extends from the second side 170 of the front plate 166 to generally about the opening 146 of the base plate 140 of the rose base 122. Additionally, as discussed below, the rose plate 124 can also include members of the indexing system 148 that are positioned about or around at least a portion of the opening 176 and/or opening hub 178 that mate with other members of the indexing system 148 of the base plate 140 of the rose base 122 in a manner that allows the rose plate 124 to be assembled to the base plate 140 in a selected one of two or more possible relative orientations.

Figure 4:
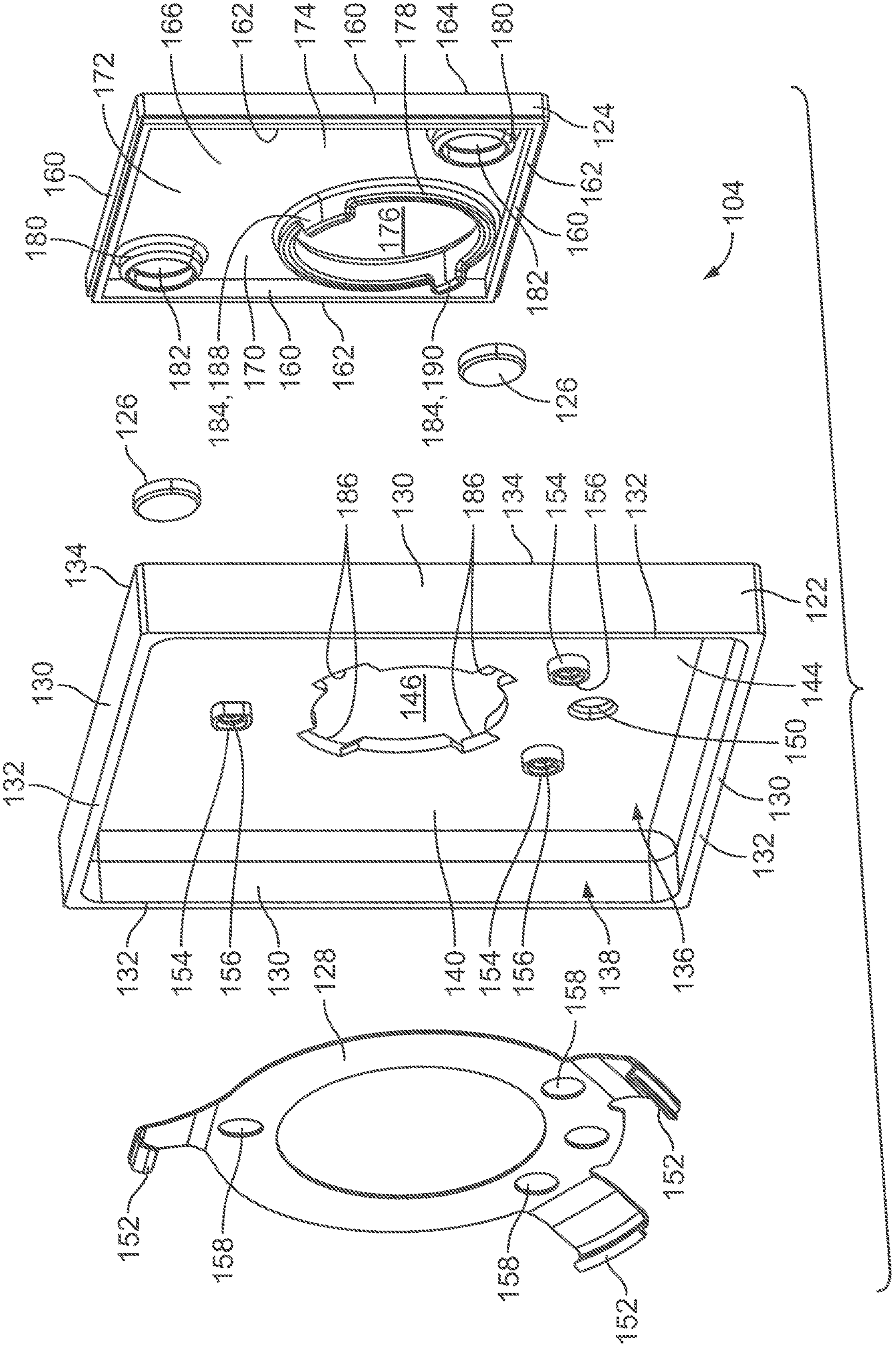
FIG. 4 illustrates an exploded side perspective view of an exemplary rose assembly according to an illustrated embodiment of the present application.

As shown in at least FIGS. 4 and 8, according to certain embodiments, the rose plate 124 can also include one or more retention hubs 180 that are configured to secure, or otherwise retain a relative position of, one or more plate fasteners 126. Similar to the opening hub 178, the retention hubs 180 can extend from the second side 170 of the front plate 166 by a distance that may, or may not, be similar to the distance the opening hub 178 extends into the inner region 172. According to the illustrated embodiment, the retention hubs 180 include a pocket 182 that is configured to receive placement of at least a portion of a plate fastener 126. A variety of different types of devices can be utilized as the plate fasteners 126, including, for example, devices that can at least assist in retaining the rose plate 124 in secure engagement via a mechanical, magnetic, and/or adhesive connection. For example, according to the illustrated embodiment, the plate fastener 126 can include one or more magnets that are secured or otherwise positioned within the pockets 182 of the retention hubs 180 and which, when the rose plate 124 is assembled to the rose base 122, provide a magnetic force directed to the rose base 122 that at least assists in retaining the rose plate 124 and rose base 122 in secure engagement at a selected relative orientation. Alternatively, according to certain embodiments in which the plate fastener(s) 126 is double sided tape, the retention hubs 180 can provide surface to which one side of the double-sided tape can be adhered, while a second side of the double-sided tape is adhered to the rose base 122. Alternatively, the retention hubs 180 can provide a surface for placement of a plate fastener 126 in the form of an adhesive or glue that, when the rose plate 124 is assembled to the rose base 122, provides a bond that at least assists in securing the rose plate 124 to the rose base 122 at the selected orientation. According to other embodiments, the retention hubs 180 can provide plate fasteners 126 in the form of projections that can lockingly engage mating receptacles on the rose base 122, including, but not limited to, cantilevers and/or pegs, among others. While the foregoing has been discussed in terms of the rose plate 124 including retention hubs 180, according to other embodiments, the rose plate 124 may not include the inner region 172, but instead can be a generally continuous surface that may or may not provide recesses to accommodate the placement of the plate fastener(s) 126. Alternatively, while the foregoing has been discussed in terms of the retention hubs 180 extending from the second side 170 of the front plate 166, according to other embodiments, the retention hubs 180 may extend from the outer face 142 of the base plate 140 and toward second side 170 of the front plate 166 of the rose plate 124.

As previously mentioned, the indexing system 148 can be configured to at least assist in securing the rose plate 124 to the rose base 122. Additionally, the indexing system 148 can be configured to control or limit the number of orientations at which the rose plate 124 can be coupled or otherwise assembled to the rose base 122. According to the illustrated embodiments, the indexing system 148 can include one or more male members 184 that are positioned on one of the rose plate 124 and the rose base 122, and one or more female members 186 that are positioned on the other of the rose plate 124 and the rose base 122. For example, according to the illustrated embodiment, the male members 184 can comprise a first cantilever, peg, protrusion, detent, or post 188 and a second cantilever, peg, protrusion, detent, or post 190 that extend from the opening hub 178. Additionally, the first post 188 can have a size, such as, for example, an arch length or width (as indicated by "$W_1$" in FIG. 8) that is different than the corresponding size, such as, for example, an arch length or width (as indicated by "$W_2$" in FIG. 8) of the second post 190. As discussed below, such differences in sizes of the first and second posts 188, 190 can result in the one of the first and second posts 188, 190 being able to matingly engage some, but not all, of the female members 186.

Further, according to the illustrated embodiment, the first post 188 can be positioned on a side of the opening 176 of the front plate 166 of the rose plate 124 that is generally opposite to, or around 180 degrees away from, the second post 190. Additionally, according to the illustrated embodiment, the first and second posts 188, 190 are arranged diagonally relative to the rose plate 124. For example, as shown in FIG. 8, the first and second posts 188, 190 can be generally centrally positioned about a diagonal axis 190 that extends between two diagonally opposed corners 192*a*, 192*b* of the rose plate 124. However, according to other embodiments, the first and second posts 188, 190 can be arranged at a variety of other orientations and/or locations relative to the rose plate 124 in addition to, or in lieu of, the above-discussed diagonal arrangement.

As shown in at least FIG. 6, according to the illustrated embodiment, the female members 186 of the indexing system 148 can comprise a first pair of recesses or slots 194 and a second pair of recesses or slots 196. As illustrated, the first pair of slots 194 can comprise a first slot 194*a* and a second slot 194*b* that generally have a size, such as, for example, an arc length or width ("$W_3$" in FIG. 6), that is at least generally similar to, or the same as, the arc length or width ("$W_1$") of the first post 188. Similarly, the second pair of slots 196 can comprise a first slot 196*a* and a second slot 196*b* that generally have a size, such as, for example, an arc length or width ("$W_4$" in FIG. 6), that is at least generally similar to, or the same as, the arc length or width ("$W_2$") of the second post 190. Thus, according to the illustrated embodiment, the size of the first post 188, such as the arc length or width, can exceed the corresponding size of each of the first slot 196*a* and the second slot 196*b* of the second pair of slots 196 such that the first post 188 cannot be matingly received in either of those slots 196*a*, 196*b*. Accordingly, the first post 188 may thus have a size that limits the first post 188 to being matingly received in only the first slot 194*a* and the second slot 194*b* of the first pair of slots 194. Further, the first pair of slots 194 are positioned relative to the second pair of slots 196 such that the second post 190 is received in at least one of the first slot 196*a* and the second slot 196*b* of the second pair of slots 196 when the first post 188 is received in one of the first and second slots 194*a*, 194*b* of the first pair of slots 194. Additionally, as shown in at least FIGS. 5 and 7, the portion of the slots 194*a*, 194*b*, 196*a*, 196*b* adjacent to the outer face 142 of the base plate 140 can include a surface feature 198, such as, for example, a chamfer, taper, or radius, among other surface features, that can assist in guiding the first or second post 188, 190 into their corresponding slot 194*a*, 194*b*, 196*a*, 196*b* during assembly of the rose plate 124 to the rose base 122.

As previously discussed, according to the illustrated embodiment, the first and second posts 188, 190 can be arranged diagonally relative to the rose plate 124. Thus, according to such an arrangement, each of the slots 194*a*, 194*b*, 196*a*, 196*b* can outwardly extend from the opening 146 in the base plate 140 toward the nearest adjacent corner, as shown for example, in at least FIG. 6. Additionally, in the orientation depicted in FIG. 6, the first slot 194*a* and the second slot 194*b* of the first pair of slots 194 can be located around an upper half of the opening 146, and the first slot 196*a* and the second slot 196*b* of the second pair of slots 196 can be located around the lower half of the opening 146. Thus, with respect to the circular cross sectional shape of the opening 146 in the depicted base plate 140, the first slot 194*a* and the second slot 194*b* of the first pair of slots 194 can be located at around the 45 degree and 315 degree locations, as indicated in FIG. 6 by "$\theta_1$" and "$\theta_4$", respectively. Similarly, the first slot 196*a* and the second slot 196*b* of the second pair of slots 196 can be located at around the 135 degree and 225 degree locations, as indicated in FIG. 6 by "$\theta_2$" and "$\theta_3$", respectively.

Accordingly, in the illustrated embodiment, the possible orientations at which the rose plate 124 can be assembled to the rose base 122 can be controlled, at least in part, by the locations of at least the first pair of slots 194. For example, in the illustrated embodiment, the first slots 194*a*, 196*b* of both the first and second pairs of slots 194, 196 are positioned on one side of the opening 146 in the base plate 140 of the rose base 122, while the second slots 194*b*, 196*b* of the first and second pairs of slots 194, 196 are positioned on the other side of the opening 146. Such a configuration can limit the placement of the rose plate 124 in two orientations relative to the rose base 122. Further, as the rose plate 124 can have an asymmetrical configuration, each of the two possible orientations can, when the rose plate 124 is assembled to the rose base 122, provide different aesthetic appearances and/or allow the asymmetrical rose plate 124 to be selectively positioned in either a right hand orientation of a left hand orientation, as shown for example in FIGS. 9 and 10.

While the above examples of the indexing system 148 are discussed and illustrated with respect to the male members 184 extending from the rose plate 124, and the female members 186 being positioned on the base plate 140, according to other embodiments, the male members 184 can extend from the base plate 140 and the female members 186 can be positioned on the rose plate 124. Additionally, while the foregoing examples discuss the rose plate 124 being secured at a selection one of two possible orientations, the indexing system 148 can be configured to provide more additional orientations, such as, for example, by the addition of more slots 194*a*, 194*b*, 196*a*, 196*b* for each of the posts 188, 190 to possibly be received. Additionally, while the above exemplary indexing system 148 utilizes differences in sizes to control the orientations at which the rose plate 124 can be assembled to the base plate 140, a variety of other types of indexing or keying systems can be employed. For example, according to certain embodiments, two or more of the male members 184 and the matting female members 186 can have different cross sectional shapes that control which male members 184 can, or cannot, be receive in the different female members 186. For example, the indexing system 148 could include a first post and one or more first slots, or vice versa, having a mating circular cross sectional shapes, and a second post and one or more second slots, or vice versa, having mating rectangular cross sectional shapes. According to such an embodiment, the circular cross sectional shape of the first post(s) may not be able to be inserted into the rectangular cross sectional shape of the second slot(s), and, similarly, the rectangular cross sectional shape of the second post(s) may not be able to be inserted into the circular cross sectional shape of the first slot(s). Alternatively, the indexing system 148 can comprise a combination of a plurality of projections and recesses in both of the rose base 122 and the rose plate 124 that can only matingly engage each other when the rose plate 124 is at two or more orientations relative to the rose base 122.

Figure 11:
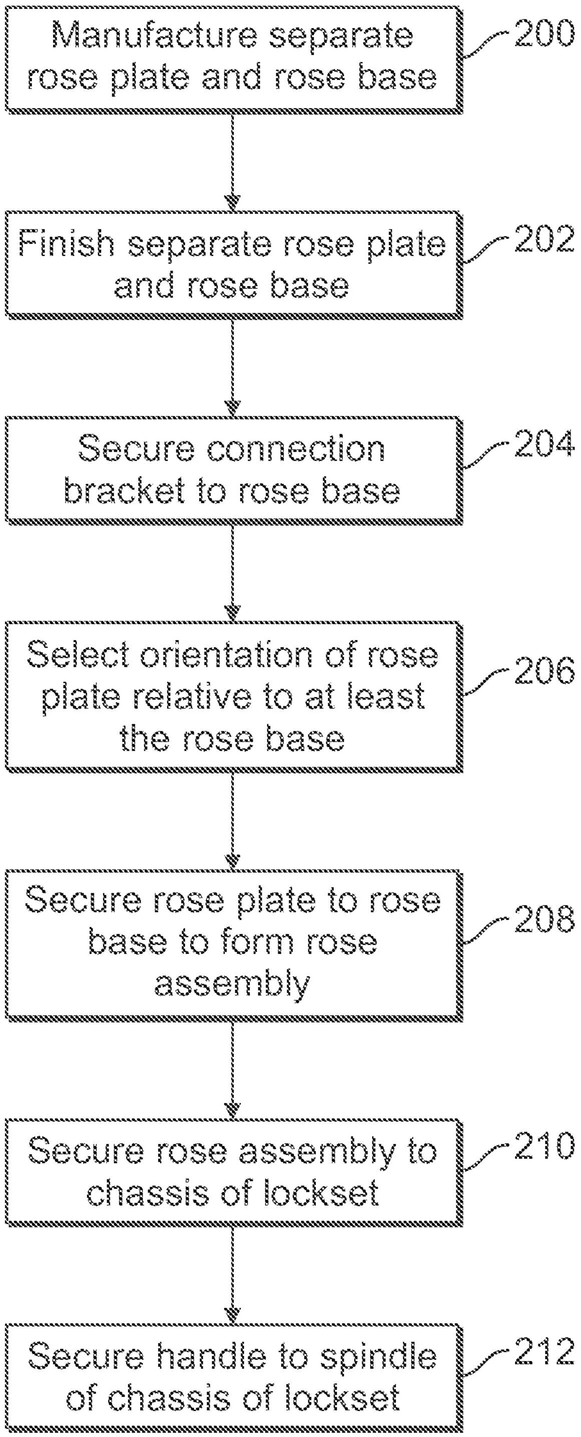
FIG. 11 illustrates a schematic flow diagram of an exemplary process for providing and installing a rose assembly.

FIG. 11 illustrates a schematic flow diagram of an exemplary process for providing and installing a rose assembly 104. The operations illustrated for all of the processes in the present application are understood to be examples only, and operations may be combined or divided, and added or removed, as well as re-ordered in whole or in part, unless explicitly stated to the contrary. At step 200, the rose base 122 and rose plate 124 may be separately manufactured and/or as separate or separable components. As discussed above, the rose base 122 and rose plate 124 can be constructed from a variety of different materials, or combinations of materials. Additionally, the material(s) used to construct the rose base 122 may or may not be the same as those used in the construction of the rose plate 124. Thus, the rose base 122 and rose plate 124 can be manufactured using a variety of different techniques, including, but not limited to, casting, molding, stamping, and adaptive manufacturing, among other manufacturing techniques. At step 202, the rose base 122 and rose plate 124 can be finished, such, as, for example, coated or sprayed within one or more colors or finishes, as well as possibly textured, among other types of finishing. The coating or spraying may also impart the rose base 122 and rose plate 124 with similar or different patterns or appearances so that, when assembled, the rose assembly 104 provides the desired aesthetic. Further, as the rose base 122 and rose plate 124 are separate components, such finishing of the rose plate 124 can be performed separately to any finishing that may be performed on the rose base 122. At step 204, the connection bracket 128 can be secured to the rose base 122, such as, for example, via the use of mechanical fasteners that pass through fastener openings 158 in the connection bracket 128 and securely engage the one or more attachment members 154 of the inner face 144 of the base plate 140.

Figure 9:
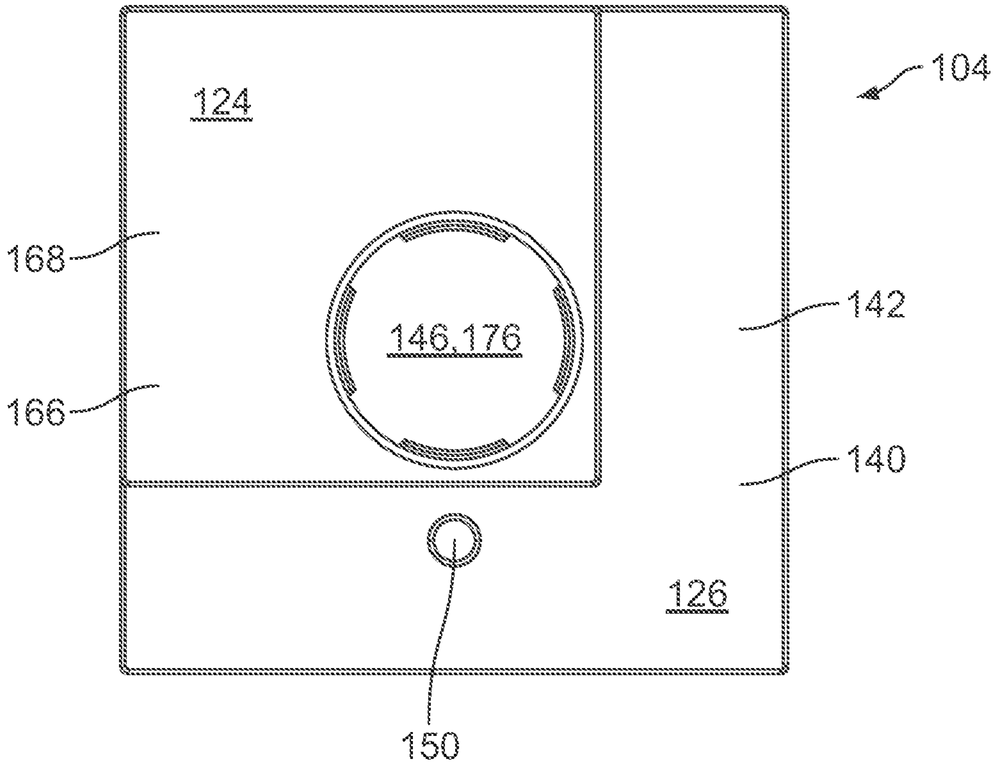
FIG. 9 illustrates a front view of an exemplary rose assembly having a rose plate in a first position relative to at least a rose base according to an illustrated embodiment of the subject application.
Figure 10:
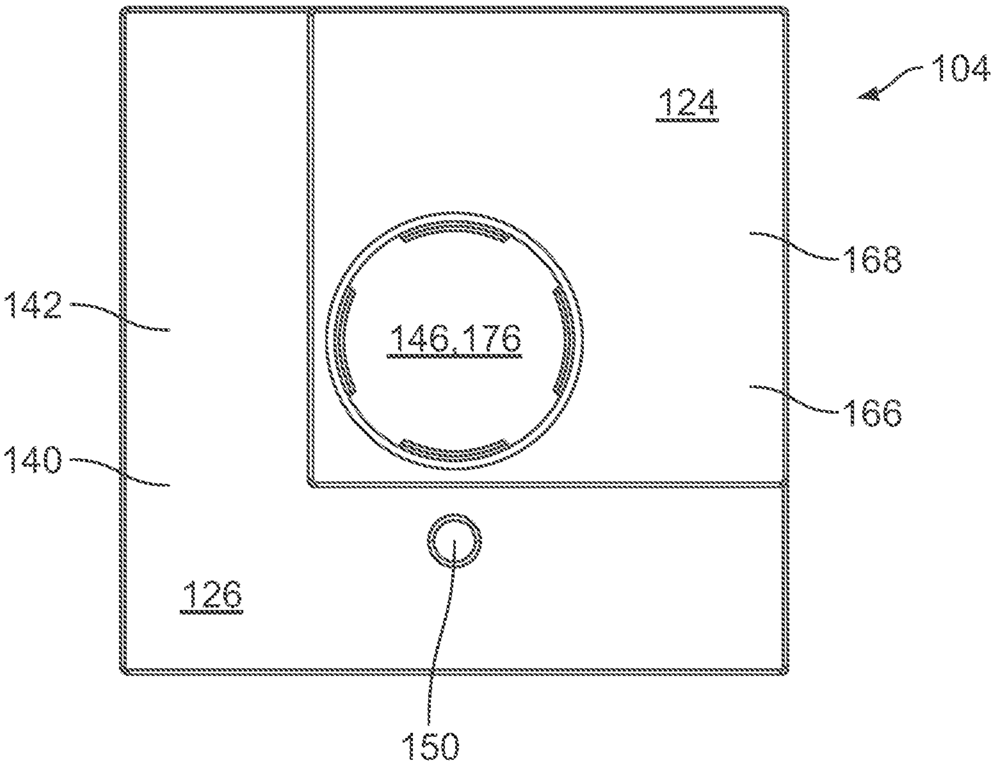
FIG. 10 illustrates a front view of an exemplary rose assembly having a rose plate in a second position relative to at least a rose base according to an illustrated embodiment of the subject application.

At step 206, an orientation for placement of the rose plate 124 relative to at least the rose base 122 can be selected. For example, as shown in FIG. 9, if the rose assembly 104 is to be configured for a left handed orientation, then the asymmetrical rose plate 124 of the illustrated embodiment may be oriented such that the rose plate 124 primarily covers the upper left side portion of the outer face 142 of the base plate 140 of the rose base 122. In such a configuration, according to the illustrated embodiment, the rose plate 124 may be aligned such that, when assembled, the first post 188 will be received into the second slot 194*b* of the first pair of slots 194, and the second post 190 will be received in the first slot 196*a* of the second pair of slots 196. Conversely, if at step 206 the rose assembly 104 is to be configured for a right handed orientation, then the asymmetrical rose plate 124 of the illustrated embodiment may be oriented such that the rose plate 124 primarily covers the upper right side portion of the outer face 142 of the base plate 140 of the rose base 122, as shown for example in FIG. 10. In such a configuration, according to the illustrated embodiment, the rose plate 124 may be aligned such that, when assembled, the first post 188 will be received into the first slot 194*a* of the first pair of slots 194, and the second post 190 will be received in the second slot 196*b* of the second pair of slots 196.

At step 208, the rose plate 124 can be secured to the rose base 122. As previously discussed, such securing can include the use of one or more plate fasteners 126, including, for example, magnets, double sided tape, adhesives, and/or mechanical fasteners such as cantilevered posts and pegs, among manners of securing the rose plate 124 to the rose base 122. Additionally, such securing can also include the insertion of the first post 188 into one of the first and second slots 194*a*, 194*b* of the first pair of slots 194, and insertion of the second post 190 into one of the first and second slots 196*a*, 196*b* of the second pair of slots 196 based on the selected orientation for the asymmetrical rose plate 124. At step 210, the rose assembly 104 can be secured to the chassis 102 of the lockset, such as, for example, via secure engagement of the connection bracket 128 with the lock chassis 102 of the lockset. As previously discussed, such securing to the lock chassis can include the plurality of hook shaped clips 152 of the connection bracket 128 extending around, or snapping into, a portion the chassis 102 in a manner that secures at least the connection bracket 128 to the chassis 102. With the rose assembly 104 both assembled and secured to the chassis, at step 212, the handle 118 can be secured to the chassis 102.

While the invention has been described in connection with what is presently considered to be the most practical and preferred embodiment, it is to be understood that the invention is not to be limited to the disclosed embodiment (s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A rose assembly, comprising:

a rose plate;

a rose base having a front face and an outer sidewall extending from the front face and about an outer periphery of the rose base; and an indexing system configured to facilitate selective placement of the rose plate relative to the rose base at one of a plurality of assembly orientations, wherein the rose plate covers a first portion of the front face of the rose base when in a first of the plurality of assembly orientations, and covers a second portion of the front face of the rose base that differs from the first portion of the front face when in a second of the plurality of assembly orientations, and wherein the rose plate is selectively and securely maintained and rotationally secured to the rose base at each of the first and second assembly orientations to inhibit rotation of the rose plate relative to the rose base and to define final installation configurations of the rose assembly.

2. The rose assembly of claim 1, wherein the indexing system comprises at least one male member and at least one female member, the at least one male member being positioned on one of the rose plate and the rose base, and the at least one female member positioned on the other of the rose plate and the rose base.

3. The rose assembly of claim 2, wherein the at least one male member includes a post, and wherein the at least one female member comprises a pair of openings, each of the openings corresponding to a different one of the plurality of assembly orientations and configured to receive selective insertion of the post.

4. The rose assembly of claim 1, further including one or more magnets configured to secure the rose plate to the rose base at a selected one of the plurality of assembly orientation.

5. The rose assembly of claim 1, wherein the rose plate has a first opening, the rose base has a second opening, and for the plurality of assembly orientations, the first opening is generally aligned and in communication with the second opening.

6. The rose assembly of claim 5, wherein the first opening in the rose plate has a first geometric center point, and wherein the rose plate has a second geometric center point that is offset from the first geometric center point.

7. The rose assembly of claim 1, wherein the rose assembly further includes a connection bracket configured to secure the rose assembly to a chassis of a lockset, wherein the connection bracket comprises a spring clip, and wherein the rose base includes an interior area having a depth that provides a recess into the rose base to receive recessed placement of at least a portion of the spring clip.

8. The rose assembly of claim 1, wherein the rose plate includes an outer wall that extends about an outer periphery of the rose plate, and wherein the outer abuts the front face of the rose base in each of the first and second assembly orientations.

9. A rose assembly, comprising:

a rose plate;

a rose base having a front face and an outer sidewall extending from the front face and about an outer periphery of the rose base; and an indexing system configured to facilitate selective placement of the rose plate relative to the rose base at one of a plurality of assembly orientations, wherein the rose plate covers a first portion of the front face of the rose base when in a first of the plurality of assembly orientations, and covers a second portion of the front face of the rose base that differs from the first portion of the front face when in a second of the plurality of assembly orientations, wherein the rose plate is selectively and securely maintained at each of the first and second assembly orientations to define final installation configurations of the rose assembly, and wherein the plurality of assembly orientations provide the rose assembly with a geometrically asymmetric configuration.

10. A rose assembly, comprising:

a rose plate;

a rose base having a front face and an outer sidewall extending from the front face and about an outer periphery of the rose base; and an indexing system configured to facilitate selective placement of the rose plate relative to the rose base at one of a plurality of assembly orientations, wherein the rose plate covers a first portion of the front face of the rose base when in a first of the plurality of assembly orientations, and covers a second portion of the front face of the rose base that differs from the first portion of the front face when in a second of the plurality of assembly orientations, wherein the rose plate is selectively and securely maintained at each of the first and second assembly orientations to define final installation configurations of the rose assembly; and wherein the rose plate has a first shape, wherein the rose base has a second shape, and wherein the first and second shapes are each square or rectangular.

11. A rose assembly, comprising:

a rose plate;

a rose base having a front face and an outer sidewall extending from the front face and about an outer periphery of the rose base; and an indexing system configured to facilitate selective placement of the rose plate relative to the rose base at one of a plurality of assembly orientations, wherein the rose plate covers a first portion of the front face of the rose base when in a first of the plurality of assembly orientations, and covers a second portion of the front face of the rose base that differs from the first portion of the front face when in a second of the plurality of assembly orientations, wherein the rose plate is selectively and securely maintained at each of the first and second assembly orientations to define final installation configurations of the rose assembly, and wherein the rose plate is positioned within the outer periphery of the rose base in each of the plurality of assembly orientations.

12. The rose assembly of claim 11, wherein the rose plate is rotationally secured to the rose base at each of the first and second assembly orientations to inhibit rotation of the rose plate relative to the rose base.

13. A rose assembly, comprising:

a rose plate;

a rose base having a front face and an outer sidewall extending from the front face and about an outer periphery of the rose base; and an indexing system configured to facilitate selective placement of the rose plate relative to the rose base at one of a plurality of assembly orientations, wherein the rose plate covers a first portion of the front face of the rose base when in a first of the plurality of assembly orientations, and covers a second portion of the front face of the rose base that differs from the first portion of the front face when in a second of the plurality of assembly orientations, wherein the rose plate is selectively and securely maintained at each of the first and second assembly orientations to define final installation configurations of the rose assembly, and wherein in each of the first and second assembly orientations, an outer edge of the rose plate is aligned with an outer edge of the rose base.

14. A rose assembly, comprising:

a rose plate;

a rose base having a front face and an outer sidewall extending from the front face and about an outer periphery of the rose base; and an indexing system configured to facilitate selective placement of the rose plate relative to the rose base at one of a plurality of assembly orientations, wherein the rose plate covers a first portion of the front face of the rose base when in a first of the plurality of assembly orientations, and covers a second portion of the front face of the rose base that differs from the first portion of the front face when in a second of the plurality of assembly orientations, wherein the rose plate is selectively and securely maintained at each of the first and second assembly orientations to define final installation configurations of the rose assembly, and wherein the first assembly orientation and the second assembly orientation are opposite handed.

15. A rose assembly, comprising:

a rose plate;

a rose base having a front face and an outer sidewall extending from the front face and about an outer periphery of the rose base; and means for selectively changing an orientation of the rose plate relative to the rose base to one of a plurality of assembly orientations, wherein the rose plate covers a first portion of the front face of the rose base when in a first of the plurality of assembly orientations, and covers a second portion of the front face of the rose base that differs from the first portion of the front face when in a second of the plurality of assembly orientations, and wherein the rose plate is selectively and securely maintained and rotationally secured to the rose base at each of the first and second assembly orientations to inhibit rotation of the rose plate relative to the rose base and to define final installation configurations of the rose assembly.

16. The rose assembly of claim 15, wherein the rose assembly further includes means for securing the rose plate to the rose base at a selected one of the plurality of assembly orientations.

17. The rose assembly of claim 15, wherein the rose assembly further includes means for connecting the rose assembly to a chassis of a lockset.

18. The rose assembly of claim 15, wherein the plurality of assembly orientations provide the rose assembly with a geometrically asymmetric configuration.

19. The rose assembly of claim 15, wherein the rose plate has a first shape, wherein the rose base has a second shape, and wherein the first and second shapes are each square or rectangular.

20. The rose assembly of claim 15, wherein the rose plate is positioned within the outer periphery of the rose base in each of the plurality of assembly orientations.

21. The rose assembly of claim 20, wherein in each of the first and second assembly orientations, an outer edge of the rose plate is aligned with an outer edge of the rose base.

22. A method, comprising:

providing a rose assembly including a rose plate and a rose base having a front face and an outer sidewall extending from the front face and about an outer periphery of the rose base; and positioning the rose plate relative to the rose base at one of a plurality of assembly orientations, wherein the positioning comprises covering a first portion of the front face of the rose base when in a first of the plurality of assembly orientations, and covering a second portion of the front face of the rose base that differs from the first portion of the front face when in a second of the plurality of assembly orientations; and selectively and securely maintaining and rotationally securing the rose plate to the rose base at each of the first and second assembly orientations to inhibit rotation of the rose plate relative to the rose base and to define final installation configurations of the rose assembly.

23. The method of claim 22, wherein the rose plate has a first opening, the rose base has a second opening, the method further comprising aligning the first opening with the second opening in each of the plurality of assembly orientations.

24. The method of claim 22, further comprising aligning an outer edge of the rose plate with an outer edge of the rose base in each of the first and second assembly orientations.

25. The method of claim 22, further comprising connecting the rose assembly to a chassis of a lockset.

26. A method, comprising:

providing a rose assembly including a rose plate and a rose base having a front face and an outer sidewall extending from the front face and about an outer periphery of the rose base; and positioning the rose plate relative to the rose base at one of a plurality of assembly orientations, wherein the positioning comprises covering a first portion of the front face of the rose base when in a first of the plurality of assembly orientations, and covering a second portion of the front face of the rose base that differs from the first portion of the front face when in a second of the plurality of assembly orientations; and selectively and securely maintaining rotationally securing the rose plate to the rose base at each of the first and second assembly orientations to inhibit rotation of the rose plate relative to the rose base and define final installation configurations of the rose assembly, and wherein the plurality of assembly orientations provide the rose assembly with a geometrically asymmetric configuration.

27. The method of claim 26, further comprising rotationally securing the rose plate to the rose base at each of the first and second assembly orientations to inhibit rotation of the rose plate relative to the rose base.

* * * * *